United States Patent [19]

Dragasevich

[11] Patent Number: 4,957,635

[45] Date of Patent: * Sep. 18, 1990

[54] BAG FILTER

[75] Inventor: John Dragasevich, Willowdale, Canada

[73] Assignee: GAF Chemicals Corporation, Wayne, N.J.

[ * ] Notice: The portion of the term of this patent subsequent to Jun. 27, 2006 has been disclaimed.

[21] Appl. No.: 311,226

[22] Filed: Feb. 15, 1989

Related U.S. Application Data

[63] Continuation-in-part of Ser. No. 157,387, Feb. 18, 1988, Pat. No. 4,842,747.

[51] Int. Cl.$^5$ ............................................. B01D 37/00
[52] U.S. Cl. .................................... 210/767; 210/413; 210/451; 210/453

[58] Field of Search ............... 210/767, 770, 335, 413, 210/415, 485, 451–453, 411; 366/250, 251, 279, 605

[56] References Cited

U.S. PATENT DOCUMENTS

| | | | |
|---|---|---|---|
| 3,367,506 | 2/1968 | Rosaen | 210/415 X |
| 3,491,889 | 1/1970 | Walters | 210/415 X |
| 3,814,261 | 6/1974 | Morgan | 210/453 |
| 3,849,309 | 11/1974 | Morris | 210/485 X |
| 4,178,246 | 12/1979 | Klein | 210/411 X |
| 4,328,103 | 5/1982 | Kraeling et al. | 210/413 X |
| 4,442,003 | 4/1984 | Holt | 210/451 X |

Primary Examiner—Bernard Nozick
Assistant Examiner—James P. Mackey
Attorney, Agent, or Firm—Richard T. Laughlin; Anthony Lagani, Jr.; Joshua J. Ward

[57] ABSTRACT

A fluid filter of the bag type that has a rotatable agitator means mounted within the filter chamber.

2 Claims, 2 Drawing Sheets

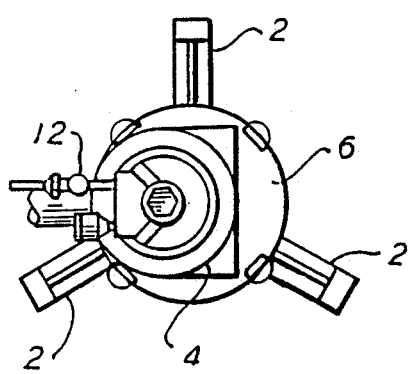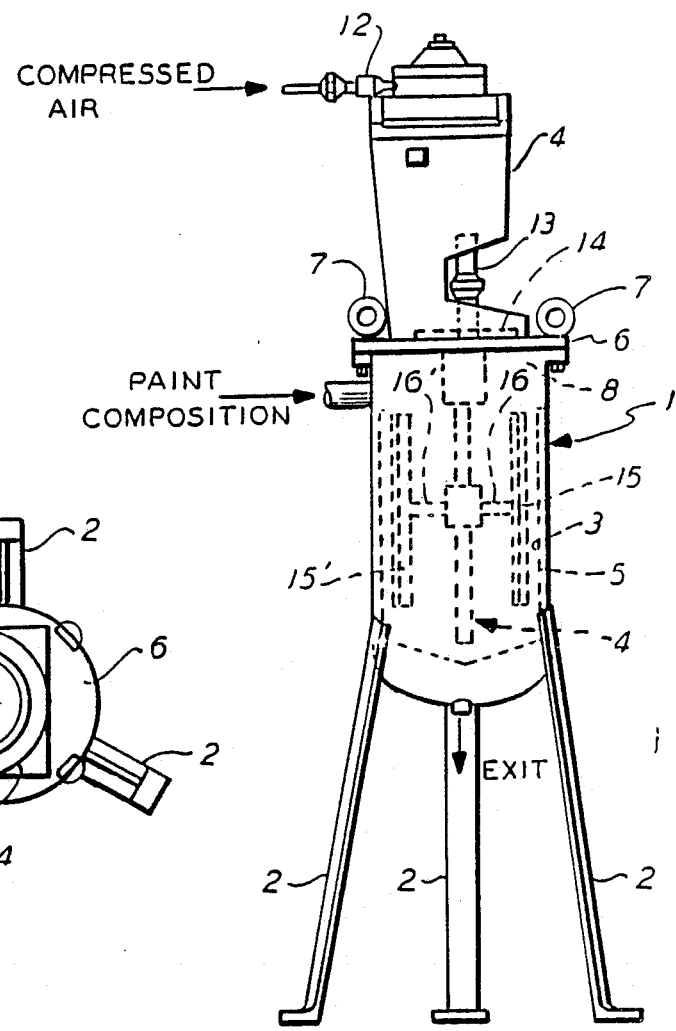

BAG FILTER

This application is a continuation in part of application Ser. No. 157,387 filed Feb. 18, 1988, U.S. Pat. No. 4,842,747 by John Dragasevich titled Bag Filter.

This invention relates to fluid filtering devices and, in particular, to such devices for use with liquids containing flake like particles.

THE PRIOR ART

With the advent of aqueous-based paints, current filtration technology was experiencing failure when filtering large flat aluminum pigments or metallic flakes added to aqueous-base paint. Such pigments are used to obtain "wet look" color effects in the paint coat. There are two major problems encountered in filtering such materials. One problem is due to the "pseudoplastic" nature of the paint. A sheer must be applied to this paint to make it flowable. The second problem is that the large flat pigments "shingle" or "plate" out at the surface of either the felt or mesh filter material which are usually used in filters for such paints. Both of these problems cause extremely long delays in the filtering process and excessive removal of pigments from the mixture.

Fluid filters incorporating blades or sprays to facilitate filtering have been well known for some time. Typical illustrations of such devices are shown in U.S. Pat. Nos. 1,993,214; 2,363,188; 2,678,732; 3,232;436; paint composition. The backwasher retainer generally indicated at 5 is preferably formed of circular top and bottom rims 9,9' with supporting vertical prongs 10 extending between the rings. In the preferred embodiment, the retainer is approximately seven inches in diameter and has eight supporting prongs 10. As is apparent, the retainer can be constructed of a variety of materials and made in a variety of arrangements such as in utilizing six to eight rings. The filter bag holder 3 is preferably conical shaped at its base 3c and has a ring 3b at its top to form in sealing engagement with the side of the chamber wall so that all of the composition has to pass through the filter element prior to exiting from the chamber through exit port 20. The filter bag 3a can be made of a woven fabric, any of the conventional felted materials or a wire screen which can be an integral part if desired.

The agitator 4 is preferably an air driven mixer with the drive element outside of the filter chamber. A unit of approximately ⅛ horse power has been found effective. Compressed air is fed to the drive element through inlet 12. The drive shaft 13 passes into the mixing chamber 8 through a stuffing box which seals the shaft to accommodate the pressure within the filter chamber which is generally of the order of 100 pounds per square inch. Although the agitator is shown as being driven by compressed air which is desirable in explosive atmospheres, it can be an electric motor or any other type of power source.

U.S. Pat. Nos. 3,349,916; 3,953,325; 4,054,528 and 4,417,246. The filters disclosed in such patents are relative complex and expensive. Furthermore, such filters are believed ineffective in dealing with plate like particles suspended in a fluid medium because of the blending problem.

THE OBJECTS OF THE INVENTION

It is an object of the invention to provide a simple and effective filter for fluids containing plate like pigment particles. Another object of the invention is to provide such a filter which is relatively inexpensive to produce. A further object of the invention is to overcome the aforesaid disadvantages of the prior art. Other objects and further advantages of the invention will appear from the following detailed description.

SUMMARY OF THE INVENTION

It has now been discovered that a filter such as one which utilizes a filter bag as the filtering element can be effective for use with paint composition containing aluminum pigments or the like by modifying the filter to include a special type of agitation of the paint composition near the surface of the filter element. The filter has a body member with an inner wall defining an axial main filtering chamber. An inlet port is provided in a horizontal plane in the upper portion of the chamber to allow flow of the paint composition into the main filter chamber. An exit port is set in the base of the filter housing through which the filtered paint passes from the filter.

A special blade agitator is placed in the chamber and a back-flush retainer is positioned between the bag and the agitator to prevent contact of the bag with the agitator. It is essential to this invention that the agitation of the paint composition at the surface of the filter bag be maintained. The amount of agitation will depend on the viscosity of the paint composition. Higher viscosities will require a greater force to move the composition. The preferred agitator has twin flat blades which pass close to the surface of the bag and parallel to the surface of the bag. What this invention achieves is a mixer/filter design which creates sufficient sheer at the surface of the filter media and a pulling of pigments from the surface of the filter bag without interfering with the composition of the paint. Formally, such compositions lead to shingling i.e. overlapping of the pigment particles requiring an extended filtering time and/or frequent changing of the filter bag.

THE DRAWINGS

FIG. 1 is a side elevation of the preferred embodiment of the filter of the invention.

FIG. 2 is a perspective view of the top of the filter shown in FIG. 1.

DETAILED DESCRIPTION OF THE INVENTION

Figure 3:
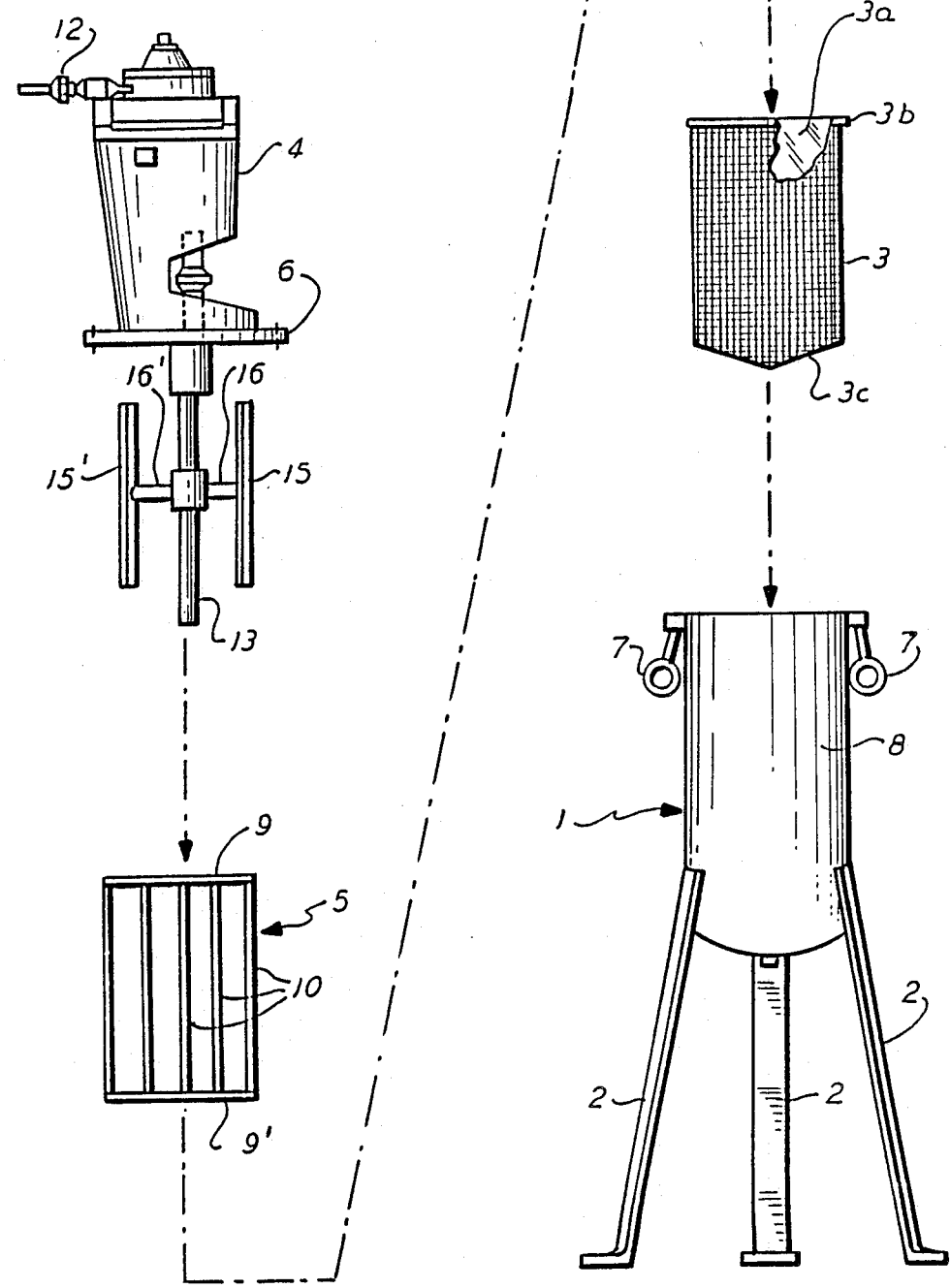
FIG. 3 is a modified exploded view showing the agitator, a backflow retainer, a filter holder, a filter bag and the base of the filter.

Referring to the drawings, the filter unit of this invention comprises a body member generally indicated at 1 supported on legs 2, a straining or filtering bag 3a, a holder for the filtering member 3, an agitating mechanism generally indicated at 4, and a backwash retainer 5 for separating the filter bag 3a from the agitator blades. The paint composition is preferably fed into the filter at a rate of about 5 to about 100 gallons per minute.

Body member 1 has a top cap 6 which is secured to the body member by a series of hinged locking rings 7 or other similar fastening devices. The top 6 is removable to allow access to the main filter chamber flow passage generally indicated at 8. This allows cleaning or changing of the bag 3a used to filter the paint composition. The backwasher retainer generally indicated at 5 is preferably formed of circular top and bottom rims 9,9' with supporting vertical prongs 10 extending between the rings. In the preferred embodiment, the retainer is approximately seven inches in diameter and has eight supporting prongs 10. As is apparent, the retainer can be constructed of a variety of materials and made in a variety of arrangements such as in utilizing six to eight rings. The filter bag holder 3 is preferably conical shaped at its base 3c and has a ring 3b at its top to form in sealing engagement with the side of the chamber wall so that all of the composition has to pass through the filter element prior to exiting from the chamber through exit port 20. The filter bag 3a can be made of a woven fabric, any of the conventional felted materials or a wire screen which can be a integral part of the retainer if desired.

The agitator 4 is preferably an air driven mixer with the drive element outside of the filter chamber. A unit of approximately ⅛ horse power has been found effective. Compressed air is fed to the drive element through inlet 12. The drive shaft 13 passes into the mixing chamber 8 through a stuffing box which seals the shaft to accommodate the pressure within the filter chamber which generally is of the order of 100 pounds per square inch. Although the agitator is shown as being driven by compressed air which is desirable in explosive atmospheres, it can be an electric motor or any other type of power source.

The agitator is within the filter chamber and consists of twin-blade elements 15, 15' mounted to the shaft 13 on arm ends 16, 16' extending from the mid point of the shaft. The two blades can be adjustable to angle from 0° to 180° in the vertical plane. The angle of the blades will depend in large measure on the thixotropic nature of the paint composition. Adjustment can be made by utilizing a set screw to fix the blades in position. The blades in the preferred arrangement are fifteen inches high, approximately one inch in width and one sixteenth of an inch in thickness. Although the agitator shown has two blades, it could also have three or four blades or more for certain types of compositions. The blades are so configured as to pass approximately one to two inches from the surface of the filter bag and parallel to the sides of the bag. This blade movement creates a turbulent sweeping action of the fluid across the bag thereby preventing adherence of particles in the fluid to the strainer and permitting passage of the pigment particles through the bag. The speed of rotation will depend on the thixotropic nature of the blade paint. With the more viscous compositions, the speed of rotation of the blade will have to be greater or up to 1750 rpm in order to obtain the minimum flow of the composition on the surface of the bag. With more standard paint composition, the speed can be as low as 25 rpm.

In operation, a paint composition containing aluminum particles, MICA or the like is fed into the filter casing. The composition passes into the filter chamber where it is subject to the action of the special agitator of this invention. The composition passes through the filter bag into the space defined by the bag and the inner wall of the chamber and out through the discharge conduit at the base of the filtering house.

The invention has been particularly described in relation to filtering latex paint containing aluminum or MICA flakes but it will be apparent to one skilled in the art that other compositions and other uses can be made of the apparatus and modifications to the apparatus. Such uses and modifications are intended to be included within the scope of the claims.

What is claimed is:

1. A gravity-aided downflow filter device for a liquid containing suspended flake like particles which comprises a body member having an inner wall defining an axial, vertical, main flow passage, an upper inlet conduit and a lower exit conduit connected to the main flow passage for the liquid being treated, an annular straining filter sealingly mounted within said main flow passage so as to define a chamber between the outer surface of said straining filter and said inner wall of said body member, agitator means mounted within said main flow passage and to be spaced from said straining filter, wherein said agitator means includes an adjustable angle blade means with a drive shaft, said drive shaft being coaxial with said straining filter along a shaft axis, said drive shaft having a plurality of peripherally spaced radial arms cantilevered therefrom, each said radial arm having an elongate blade extending in an axial direction, each said blade having a pitch angle for sweeping a wave of liquid along an inner face of the straining filter.

2. The filter device of claim 1 wherein the straining filter is a fine wire screen, and wherein said body member has a removable cap member for supporting said agitator means, and wherein said straining filter has a support member for removing the filter for cleaning after removing the cap member and wherein said straining filter has a backwash retainer for separating the straining filter from the blade means.

* * * * *